United States Patent [19]
Bickford et al.

[11] 3,739,799
[45] June 19, 1973

[54] CONTINUOUS FLOW ANESTHESIA APPARATUS

[75] Inventors: Allan M. Bickford, East Aurora; Ronald J. Czajka, Alden, both of N.Y.

[73] Assignee: Fraser Sweatman, Inc., Lancaster, N.Y.

[22] Filed: Sept. 7, 1971

[21] Appl. No.: 178,114

[52] U.S. Cl. .................................. 137/88, 137/100
[51] Int. Cl. ........................................ G05d 11/03
[58] Field of Search .................. 157/7, 100, 9, 14, 157/101, 101.19, 98, 88, 63 R

[56] References Cited
UNITED STATES PATENTS

| | | | |
|---|---|---|---|
| 3,598,134 | 8/1971 | Ollivier | 137/88 |
| 3,534,753 | 10/1970 | Ollivier | 137/88 |
| 3,605,785 | 9/1971 | Dobritz | 137/101 |

*Primary Examiner* — William R. Cline
*Attorney* — Conrad Christel and Edwin T. Bean, Jr.

[57] ABSTRACT

A gas flow control system for anesthesia apparatus including a mixture control valve operable to vary the relative proportions of two gaseous components without affecting the total flow rate thereof and a control for varying the total flow rate of these components without varying the relative proportions thereof. Flow meters are utilized to visually confirm the accuracy of the mixture control valve.

12 Claims, 2 Drawing Figures

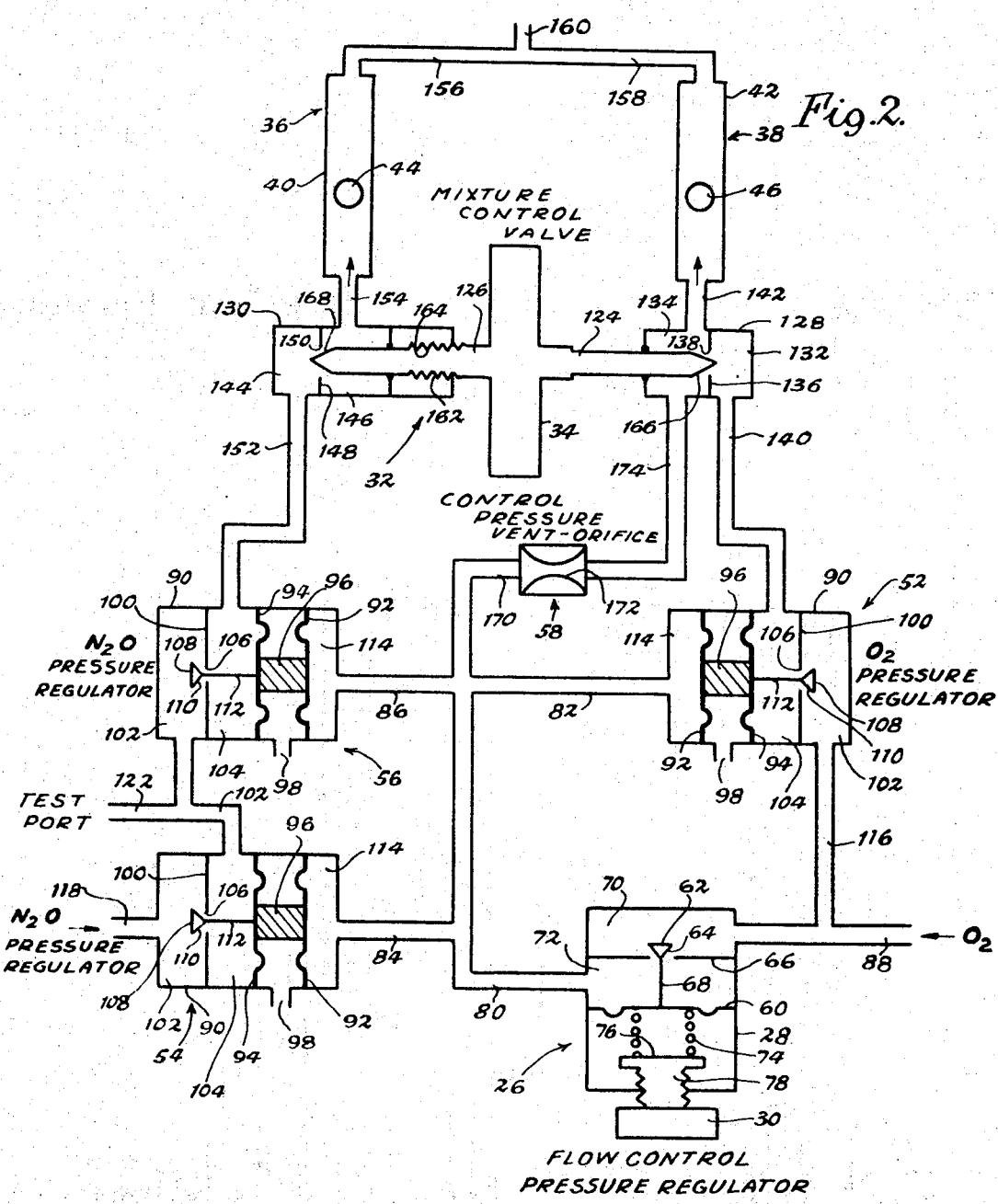

3,739,799

CONTINUOUS FLOW ANESTHESIA APPARATUS

BACKGROUND OF THE INVENTION

This invention relates generally to an anesthesia apparatus and, more particularly, to a gas flow control system for an anesthesia apparatus of the continuous flow type.

Anesthesia machines of the continuous flow type are the most widely used today and are employed in conjunction with a breathing circuit to provide a complete anesthesia system. Such machines blend or mix a gaseous anesthetic with oxygen in proportional amounts to produce a gaseous mixture having a desired flow rate. These known machines utilize individual control valves associated with individual flow meters to control the flow of each gas in order to obtain the desired oxygen concentration at the required total flow rate. In the process of administering anesthetics to a patient, it sometimes becomes necessary to either adjust the oxygen concentration while maintaining the total flow rate constant or adjust the total flow rate without changing the oxygen concentration. With these known anesthesia machines, each of the control valves must be adjusted and a computation performed to determine the flow rate required of each gaseous component to maintain the desired total flow rate. Not only is such a procedure risky from the standpoint of human error or miscalculation, but the time lapse in effecting the adjustment can be harmful to the patient.

SUMMARY OF THE INVENTION

Accordingly, it is an object of the present invention to provide a continuous flow anesthesia apparatus having an improved gas flow control system which obviates the above deficiencies.

It is another object of this invention to provide the foregoing control system with a single mixture control valve for varying the proportions of the gaseous components without affecting the total flow rate of the gaseous components.

It is a further object of the present invention to provide the foregoing control system with a control for varying the total flow rate of the gaseous components without affecting the relative proportions of these gaseous components.

In one aspect thereof, the anesthesia apparatus of the present invention is characterized by the provision of a gas flow control system in which a mixture control valve is operable to vary the relative proportions of two gaseous components without affecting the total flow rate of these components. Another control is operable to vary the total flow rate of these components without affecting the relative proportions thereof. Flow meters indicate the individual flow rates of the gaseous components and can be used to visually confirm the accuracy of the mixture control valve.

These and other objects, advantages and characterizing features of the present invention will become clearly apparent from the ensuing detailed description of an illustrative embodiment thereof, taken together with the accompanying drawings therein like reference numerals denote like parts throughout.

BRIEF DESCRIPTION OF THE DRAWING FIGURES

FIG. 1 is a front elevational view of one form of continuous flow anesthesia apparatus incorporating the gas flow control system of this invention; and FIG. 2 is a schematic view of the gas flow control system of the present invention.

DETAILED DESCRIPTION OF AN ILLUSTRATIVE EMBODIMENT

Figure 1:
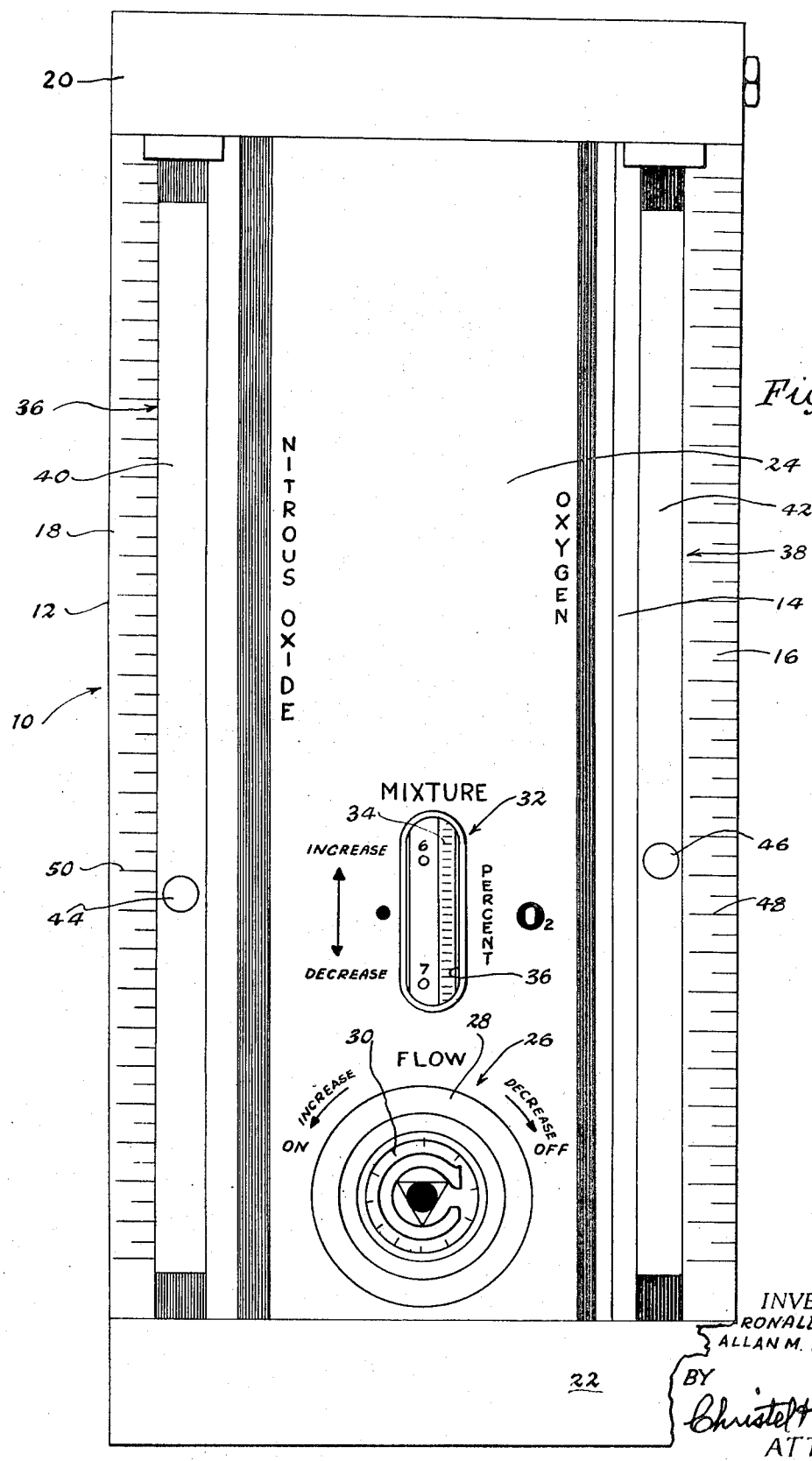

Referring now in detail to the drawings, there is shown in FIG. 1 an illustrative embodiment of a continuous flow anesthesia apparatus, generally designated 10, constructed in accordance with this invention, comprising a housing or frame 12 of a generally rectangular, box-like construction for mounting various elements, including the novel gas flow control system of this invention, in a self-contained unit. Frame 12 comprises a rear panel (not shown), a front panel 14 formed of plexiglass or any other suitable transparent material, a pair of side channels 16 and 18 connecting the rear and front panels together, an upper manifold 20 and a lower manifold 22 forming the top and bottom structural members, respectively, of frame 12.

A decal strip 24 is secured centrally on front panel 14 and is provided with various legends and indicia imprinted thereon bearing information to aid the anesthetist in operating apparatus 10. Projecting outwardly from the central lower portion of front panel 14 is a flow control valve or pressure regulator, generally designated 26, having a casing 28 and a manually operable regulating knob 30 at the outer end of casing 28. Also mounted on frame 12 and disposed above flow control pressure regulator 26 is a mixture control valve generally designated 32, having a circular, calibrated dial 34, a peripheral portion of which protrudes outwardly through a slot 36 provided in front panel 14. Thus, knob 30 and dial 34 are physically located in close proximity to each other outwardly from front panel 14 for convenient accessibility to the anesthetist. Flow control pressure regulator 26 and mixture control valve 32 will hereinafter be described in more detail in connection with the operation of the gas flow control system.

Mounted on frame 12 between the front and rear panels thereof on opposite sides of decal strip 24 are a pair of flow meters 36 and 38 for measuring and visually indicating the flow of a gaseous anesthetic, such as nitrous oxide for example, and oxygen gas, respectively. These flow meters 36 and 38 are conventional and comprise the usual vertically extending, transparent tubes 40 and 42 having balls 44 and 46 therein which have specific gravities greater than the specific gravities of the gases being measured, respectively. The annular space between each ball and the inner surface of its respective tube determines the velocity of the gas flowing upwardly through the tube and the drag forces acting on the ball. When the stream of flowing gas produces a drag force on the ball equal and opposite to the force of gravity acting on the ball, it will reach a static position of equilibrium in the tube. As the flow rate varies, the position of the ball in the tube varies accordingly so that the particular position of the ball in the tube indicates a particular flow rate. Calibrated scales 48 and 50 disposed adjacent tubes 40 and 42 indicate the rate of flow of the respective gases as measured by balls 44 and 46 within their associated tubes.

A particular feature of this invention is in the gas flow control system, an embodiment of which is shown schematically in FIG. 2, and which can be physically mounted on frame 12. In the illustrative embodiment of this invention, this gas flow control system is used in an anesthesia procedure for blending or mixing a gaseous anesthetic, such as nitrous oxide for example, with oxygen. As shown in FIG. 2, this control system includes flow control pressure regulator 26, mixture control valve 32, flow meters 36 and 38, an oxygen pressure regulator 52, a pair of gaseous anesthetic pressure regulators 54 and 56 connected in series, and a control pressure vent orifice 58.

Flow control pressure regulator 26 includes a diaphragm 60 mounted in casing 28 and a poppet type valve 62 having a seating surface 64 adapted to engage a valve seat provided on a partition 66 in casing 28. Valve 62 is provided with a valve stem 68 connected to diaphragm 60 for movement therewith. Partition 66 separates one end of casing 28 into a pressure inlet chamber 70 and a control pressure chamber 72, defined between partition 66 and diaphragm 60. A compression spring 74 is positioned between diaphragm 60 and an abutment surface 76 provided on the end of a threaded shank 78 which carries knob 30. As opposed to conventional regulators, turning knob 30 and thereby shank 78 in a counterclockwise direction, as viewed in FIG. 1, effects axial inward movement of the latter to increase the force of spring 74 against diaphragm 60 for opening valve 62 and increasing the pressure in control chamber 72. The outlet of control chamber 72 is connected to regulators 52, 54 and 56 via a main control pressure line 80 and conduits 82, 84 and 86, respectively. In the illustrative embodiment, the inlet of pressure chamber 70 is connected to a suitable source of oxygen under pressure (not shown) by means of a conduit 88.

Pressure regulators 52, 54 and 56 are identical in construction and the same reference characters will be applied to identify similar elements in these regulators. Each of these regulators comprises a housing 90 in which is mounted a pair of spaced diaphragms 92 and 94 operating as a unit and spaced apart by a spacer member 96. The space between diaphragms 92 and 94 is vented as at 98. A partition 100 is mounted in one end of housing 90 for defining an inlet chamber 102 and an outlet chamber 104. Partition 100 is provided with a passage 106 establishing communication between chambers 102 and 104. A poppet valve 108, having a seating surface 110, controls opening and closing of passage 106. Valve 108 is spring biased into closed position and is provided with a stem 112 engaged by diaphragm 94 for opening movement thereby. A control member 114 is defined between diaphragm 92 and the other end of housing 90 and reflects the pressure of the oxygen gas established in pressure control chamber 72 of flow control pressure regulator 26 as determined by the setting of knob 30.

Inlet chamber 102 of oxygen pressure regulator 52 is connected to the source of oxygen under pressure by means of a conduit 116 tapped into the main oxygen supply line 88. The inlet chamber 102 of pressure regulator 54 is connected to a source of nitrous oxide under pressure (not shown) by main supply line 118 and the inlet chamber 102 of pressure regulator 56 also is connected to the source of nitrous oxide by way of conduit 120, which is connected to the outlet of pressure regulator 54. The use of double diaphragm assemblies is especially important in the nitrous oxide regulators 54 and 56 to preclude accidental mixing of the different gases in these regulators in the event of a single diaphragm leakage. Should such leakage occur, vent 98 permits the dissipation thereof to atmosphere. Also, the second nitrous oxide pressure regulator 56, in series with the first, serves as a back-up regulator in preventing loss of control over the nitrous oxide gas in the event of leakage through the first regulator 54, such as might occur upon failure of the poppet valve therein. This is important in preventing the introduction of an excessive amount of nitrous oxide into the breathing circuit which, if not fatal, could be injurious to the patient. In normal operation, the second nitrous oxide pressure regulator 56 remains in a somewhat static, unbalanced condition whereby its poppet valve 108 remains open whenever control pressure is present in its pressure control chamber 114. A test port 122 also is tapped into conduit 120 for the purpose of conducting bench tests to confirm the proper operation of both regulators 54 and 56.

Mixture control valve 32 comprises a pair of needle valves 124 and 126 extending axially outwardly from opposite sides of the calibrated disc or dial 34 and have end portions received in valve bodies 128 and 130, respectively, in a fluid tight relation. Body 128 is divided into an inlet chamber 132 and an outlet chamber 134 by means of a partition 136 having a central passage 138 therein for establishing communication between chambers 134 and 136. Inlet chamber 132 is connected to outlet chamber 104 of oxygen pressure regulator 52 by means of a conduit 140. Outlet chamber 134 is connected to flowmeter 38 by means of a conduit 142.

One end of body 130 is divided into an inlet chamber 144 and an outlet chamber 146 by a partition 148 having a central passage 150 therein for establishing communication between chambers 144 and 146. Inlet chamber 144 is connected to the outlet chamber 104 of nitrous oxide pressure regulator 56 by means of a conduit 152 and outlet chamber 146 is connected to flow meter 36 by means of a conduit 154. The other ends of flow meters 36 and 38 are connected by conduits 156 and 158 to a common line 160 leading to the breathing circuit.

Needle valve 126 is provided with a threaded portion 162 received in a threaded bore 164 provided in the other end of body 130 for axially moving needle valves 124 and 126 relative to bodies 128 and 130, respectively. The distal ends of needle valves 124 and 126 are provided with tapered seating surfaces 166 and 168 adapted to close and open passages 138 and 150. When mixture control dial 34 is turned in one direction, valve 124 moves in an axial direction to close or decrease the flow area of passage 138 while valve 126 simultaneously moves away from its associated passage 150 to increase the flow area thereof. Turning dial 34 in the opposite direction reverses the direction of movement of valves 124 and 126. In this manner, increasing the concentration of one gaseous component and the individual flow rate thereof reduces the concentration of the other gaseous component and the flow rate thereof by an equal amount thereby varying the proportions without affecting the total flow rate.

Dial 34 can be provided with stops at each end of its rotational movement and tuned in with the closing of needle valve seating surfaces 166 and 168 in such a manner so as to provide any range of gaseous concentration desired. For example, the range of oxygen concentration can be set at 30 – 100 percent with dial 34 marked to indicate intermediate concentrations within this range.

The control pressure vent orifice 58 is connected to main control pressure line 80 by a conduit 170 and is provided with a restricted passage 172 permitting the oxygen control pressure in conduits 80–86, 170 to decrease upon rotation of regulator control 30 in a direction decreasing the total flow rate. The outlet of passage 172 is connected to outlet chamber 134 in body 128 by way of a conduit 174. Thus, the oxygen in control pressure line 80 is vented through oxygen flow meter 38 into the breathing circuit rather than to atmosphere as in conventional systems in order to prevent undesirable dissipation of pure oxygen into the atmosphere in a medical application.

In operation, the mixture control valve dial 34 is adjusted to admit the desired concentration or percentage of oxygen into the breathing circuit and flow control knob 30 is turned counterclockwise to establish the desired total flow rate. Oxygen gas is supplied to conduit 88 under a predetermined pressure, say 50 p.s.i.g., and gaseous nitrous oxide is supplied to conduit 118 under a predetermined pressure of about 50 p.s.i.g. The pressure setting of flow control pressure regulator 26 is substantially below the oxygen main line pressure. When such main line pressure in chamber 72 acting against the spring loaded diaphragm 60 produces a force just slightly greater than the force of spring 74, diaphragm 60 is caused to flex against the bias of spring 74, carrying with it stem 68 and consequently valve 62 to seat the latter. This control pressure is reflected in the control chambers 114 of oxygen pressure regulator 52 and nitrous oxide pressure regulators 54 and 56 and acts against the respective diaphragms 92 therein to unseat valve 108 and admit oxygen and nitrous oxide into flow meters 38 and 36, respectively, via the mixture control valve. When the oxygen and nitrous oxide pressure acting in chambers 104 of regulators 52 and 56, respectively, balance the control pressure acting in their respective chambers 114, diaphragms 94 will be flexed causing valves 108 to seat. Because the pressure in control line 80 is slowly dissipated through vent orifice 58, these regulators 52 and 54 will be repeatedly actuated to maintain the pressure and thereby the flow rate through flow meters 36 and 38 substantially constant. Should regulator 54 fail because of leakage past its valve 108, the second nitrous oxide regulator 56 becomes operative to control the rate of flow through flow meter 36.

The total flow rate introduced into line 160 and the breathing circuit can be varied at any time during the anesthesia procedure by simply rotating knob 30 in either direction to obtain the desired total flow rate without in any way affecting the proportions of the gaseous components. When it is desired to vary the proportions or the concentration of oxygen in the system, mixture control valve dial 34 is rotated to the desired setting to effect the adjustment without affecting the total flow rate. Flow meters 36 and 38 can be observed to visually verify the accuracy of mixture control valve 32.

From the foregoing, it is apparent that the objects of the present invention have been fully accomplished. As a result of this invention, an improved continuous flow anesthesia apparatus having a novel gas flow control system is provided for selectively varying the relative proportions of the gaseous components without affecting the total flow rate of these components thereby avoiding the computations required with known anesthesia machines of the continuous flow type. Also, the system includes a control for varying the total flow rate of these components without varying the relative proportions thereof and this control is arranged to produce the desired effect upon rotation in the direction most familiar to those working in this field. In addition, the individual flow meters provide visual verification of the selected relative proportions of the gaseous components. Moreover, there are a number of safety features incorporated in the gas flow control system of this invention including the utilization of the oxygen component as the control pressure for operating the nitrous oxide pressure regulators. In the event of oxygen supply pressure failure, the nitrous oxide regulators are automatically disabled to prevent overdosage of nitrous oxide into the breathing circuit. Also, the provision of serially connected nitrous oxide regulators precludes uncontrolled flow of the nitrous oxide in the event of leakage through one of these regulators. The double diaphragm arrangement insures against the uncontrolled mixing of the two gases upon leakage of one of such diaphragm. By the provision of an oxygen control pressure vent orifice having an outlet discharging through the oxygen flow meter into the breathing circuit, dissipation of the oxygen into the ambient atmosphere to create a safety hazard is eliminated. Also, the oxygen is conserved.

It should be understood that the gas flow control system of this invention is not limited in use with gaseous anesthetic components, but has utility in any application where it is desired to mix two gases in selected proportions at desired flow rates.

One embodiment of this invention having been described and illustrated in detail, it is to be understood that this has been done by way of illustration only.

We claim:

1. Continuous flow anesthesia apparatus comprising at least two flowmeters, means for supplying one fluid component to one of said flowmeters, means for supplying another fluid component to another of said flowmeters, each of said flowmeters being operable to measure and visually indicate the rate of flow of the respective component, mixture control valve means operable to increase the rate of flow of either of said components to its associated flowmeter and simultaneously decrease the rate of flow of the other of said components to its associated flowmeter to vary the relative proportions of said components substantially without varying the total rate of flow of said components, and flow control means operable to vary the total rate of flow of said components substantially without varying the relative proportions thereof.

2. Continuous flow anesthesia apparatus according to claim 1 including means mounting said mixture control valve means and said flow control means in close proximity to each other on said apparatus for convenient accessibility.

3. Continuous flow anesthesia apparatus according to claim 1 wherein said mixture control valve means comprises a manually operable member, and a pair of coaxial aligned needle valves extending in opposite directions from said manually operable member for controlling the flow of said fluid components to the respective flow meters thereof.

4. Continuous flow anesthesia apparatus according to claim 1 wherein said flow control means comprises a fluid regulator having a fluid inlet connected to a source of said one fluid component under pressure and a fluid outlet, valve means in said fluid regulator for controlling the flow of said one fluid component from said fluid inlet to said fluid outlet, and spring biased means for actuating said valve means to establish communication between said fluid inlet and said fluid outlet.

5. Continuous flow anesthesia apparatus according to claim 4 wherein said flow control means includes second and third fluid regulators having fluid inlets connected to respective sources of said fluid components under pressure and fluid outlets connected to respective ones of said flowmeters, said second and third regulators having valve means for controlling the flow of said fluid components from said fluid inlets to said fluid outlets.

6. Continuous flow anesthesia apparatus according to claim 5 wherein said second and third regulators are provided with control chambers, passage means connecting said control chambers to said first fluid regulator outlet for establishing control pressures in said chambers, and means responsive to pressures in said control chambers as determined by operation of said first regulator for actuating said second and third regulator valve means.

7. Continuous flow anesthesia apparatus according to claim 6 wherein said responsive means in each of said second and third regulators comprises a pair of spaced diaphragms connected together and interposed between said fluid outlet and said pressure chamber of said regulator, and means placing the spaces between said pair of diaphragms in communication with the ambient atmosphere.

8. Continuous flow anesthesia apparatus comprising at least two flowmeters, means for supplying one fluid component to one of said flowmeters, means for supplying another fluid component to another of said flowmeters, mixture control valve means operable to increase the rate of flow of either of said components to its associate flowmeter and simultaneously decrease the rate of flow of the other of said components to its associated flowmeter to vary the relative proportions of said components substantially without varying the total rate of flow of said components, and flow control means operable to vary the total rate of flow of said components substantially without varying the relative proportions thereof, said flow control means comprising a fluid regulator having a fluid inlet connected to a source of said one fluid component under pressure and a fluid outlet, valve means in said fluid regulator for controlling the flow of said one fluid component from said fluid inlet to said fluid outlet, and spring biased means for actuating said valve means to establish communication between said fluid inlet and said fluid outlet, said flow control means further including second and third fluid regulators having fluid inlets connected to respective sources of said fluid components under pressure and fluid outlets connected to respective ones of said flowmeters, said second and third regulators having valve means for controlling the flow of said fluid components from said fluid inlets to said fluid outlets; said second and third regulators being provided with control chambers, passage means connecting said control chambers to said first fluid regulator outlet for establishing control pressures in said chambers, and means responsive to pressures in said control chambers as determined by operation of said first regulator for actuating said second and third regulator valve means, and a fourth regulator connected in series with said third regulator for control operation in the event of failure of said third regulator.

9. A system according to claim 8 wherein said fluid components are gases and said flowmeters directly measure the rate of flow therethrough of the respective components.

10. Continuous flow anesthesia apparatus comprising at least two flowmeters, means for supplying one fluid component to one of said flowmeters, means for supplying another fluid component to another of said flowmeters, mixture control valve means operable to increase the rate of flow of either of said components to its associated flowmeter and simultaneously decrease the rate of flow of the other of said components to its associated flowmeter to vary the relative proportions of said components substantially without varying the total rate of flow of said components, and flow control means operable to vary the total rate of flow of said components substantially without varying the relative proportions thereof, said flow control means comprising a fluid regulator having a fluid inlet connected to a source of said one fluid component under pressure and a fluid outlet, valve means in said fluid regulator for controlling the flow of said one fluid component from said fluid inlet to said fluid outlet, and spring biased means for actuating said valve means to establish communication between said fluid inlet and said fluid outlet, said flow control means further including second and third fluid regulators having fluid inlets connected to respective sources of said fluid components under pressure and fluid outlets connected to respective ones of said flowmeters, said second and third regulators having valve means for controlling the flow of said fluid components from said fluid inlets to said fluid outlets, said second and third regulators being provided with control chambers, passage means connecting said control chambers to said first fluid regulator outlet for establishing control pressures in said chambers, and means responsive to pressures in said control chambers as determined by operation of said first regulator for actuating said second and third regulator valve means, and wherein said passage means is provided with a vent orifice downstream of said regulator control chambers.

11. Continuous flow anesthesia apparatus according to claim 10 wherein said orifice is provided with an outlet connected to said one fluid component flowmeter.

12. A flow control system for anesthesia apparatus comprising separate supply circuits, a common outlet line, at least two flowmeters, means including one of said supply conduits for supplying a first fluid component through one of said flowmeters to said common line, means including another of said supply conduits for supplying another fluid component through another of said flowmeters to said common line, means operable to increase the rate of flow of either of said components and simultaneously decrease the rate of flow of the other of said components to vary the relative proportions of said components substantially without varying the total rate of flow of said components, and means operable to vary the total rate of flow of said components substantially without varying the relative proportions thereof, said flowmeters measuring and indicating the rate of flow of the components flowing therethrough, and said components being mixed in said common line.

* * * * *

UNITED STATES PATENT OFFICE
CERTIFICATE OF CORRECTION

Patent No. 3,739,799　　　　　　　　Dated June 19, 1973

Inventor(s) Allan M. Bickford, Ronald J. Czajka

It is certified that error appears in the above-identified patent and that said Letters Patent are hereby corrected as shown below:

In patent claim 9, line 1, cancel "8" and substitute therefor ---12---.

In patent claim 12, line 2, after "supply" cancel "circuits" and substitute therefor ---conduits---.

Signed and sealed this 18th day of December 1973.

(SEAL)
Attest:

EDWARD M. FLETCHER, JR.　　　　RENE D. TEGTMEYER
Attesting Officer　　　　　　　　Acting Commissioner of Patents